(12) United States Patent
Liao (10) Patent No.: US 11,163,827 B2
(45) Date of Patent: Nov. 2, 2021

(54) VIDEO PROCESSING METHOD, DEVICE, TERMINAL AND STORAGE MEDIUM (71) Applicant: Beijing Microlive Vision Technology Co., Ltd, Beijing (CN)

(72) Inventor: Zhi Liao, Beijing (CN)

(73) Assignee: Beijing Microlive Vision Technology Co., Ltd, Beijing (CN)

( * ) Notice: Subject to any disclaimer, the term of this patent is extended or adjusted under 35 U.S.C. 154(b) by 0 days.

(21) Appl. No.: 16/754,282

(22) PCT Filed: Dec. 28, 2018

(86) PCT No.: PCT/CN2018/124775
§ 371 (c)(1),
(2) Date: Apr. 7, 2020

(87) PCT Pub. No.: WO2020/010817
PCT Pub. Date: Jan. 16, 2020

(65) Prior Publication Data
US 2020/0327161 A1  Oct. 15, 2020

(30) Foreign Application Priority Data
Jul. 12, 2018 (CN) .......................... 201810765207.6

(51) Int. Cl.
*H04N 9/80* (2006.01)
*G06F 16/783* (2019.01)
*G06F 16/71* (2019.01)
*G06F 16/74* (2019.01)
(Continued)

(52) U.S. Cl.
CPC .......... *G06F 16/7834* (2019.01); *G06F 16/71* (2019.01); *G06F 16/74* (2019.01); *G06F 16/7867* (2019.01)

(58) Field of Classification Search
CPC ...... G06F 16/70; G06F 16/74; G06F 16/7867; G06F 16/71; G06F 16/7834; G06F 16/60
USPC ....... 386/241, 285, 353, 210, 224, 229, 239, 386/248
See application file for complete search history.

(56) References Cited

U.S. PATENT DOCUMENTS

2006/0274201 A1   12/2006  Lim
2017/0332020 A1*  11/2017  Ouyang ................. G10H 1/368

FOREIGN PATENT DOCUMENTS

CN  103686340 A  3/2014
CN  105872583 A  8/2016
CN  105959773 A  9/2016
(Continued)

OTHER PUBLICATIONS

"CN 108900768" Title: VIdeo shooting method, device, terminal, server and storage medium. Publication Date: Nov. 27, 2018.*
(Continued)

*Primary Examiner* — Robert Chevalier
(74) *Attorney, Agent, or Firm* — BakerHostetler (57) ABSTRACT

The video processing method, device, terminal, and storage medium are provided; the method includes: acquiring a video captured by a user and marking the video with original sound in the case that the video is a video with original sound; performing data separation on the video with original sound according to the mark, and extracting the original audio from the video with original sound; the extracted original sound audio is used for video shooting by other users.

17 Claims, 5 Drawing Sheets

(51) Int. Cl.
*G06F 16/78* (2019.01)
*H04N 5/93* (2006.01)

(56) References Cited

FOREIGN PATENT DOCUMENTS

| CN | 107566769 A | 1/2018 |
| CN | 108228278 A | 6/2018 |
| CN | 108881766 A | 11/2018 |

OTHER PUBLICATIONS https://soft.shouji.com.cn/news/4773.html; Shouji; Jun. 10, 2018; accessed Aug. 11, 2020; 4 pages (contains English Abstract).
International Patent Application No. PCT/CN2018/124775; Int'l Search Report; dated Apr. 3, 2019; 2 pages.
European Patent Application No. 18925739.7; Extended Search Report; dated Jul. 9, 2021; 7 pages.

\* cited by examiner

VIDEO PROCESSING METHOD, DEVICE, TERMINAL AND STORAGE MEDIUM

CROSS REFERENCE TO RELATED APPLICATION

The disclosure is the U.S. National Stage of International Application No. PCT/CN2018/124775, filed on Dec. 28, 2018, which claims the priority benefit of Chinese Application No. 201810765207.6, filed on Jul. 12, 2018, the entire contents of which are incorporated herein by reference.

TECHNICAL FIELD

The disclosure relates to the field of Internet technology, and more particularly to a video processing method, device, terminal and storage medium.

BACKGROUND

The development of network technology makes video interactive applications very popular in people's daily lives.

For Internet enterprises with video interactive applications, meeting the needs of users and providing users with a satisfactory product experience is a key factor that cannot be ignored to maintain the competitiveness of the enterprise. However, Internet enterprises that provide video interactive application services have not fully managed and utilized the videos that users shot.

At the same time, for users, in the process of shooting videos using mobile applications, they either shoot directly, or select background music from existing songs for video shooting according to personal preferences, lead to very limited user choices of shooting elements.

SUMMARY

Embodiments of the disclosure provide a video processing method, device, terminal and storage medium, to achieve effects of fully managing and utilizing videos shoot by users, enriching elements used for video shooting.

An embodiment of the disclosure provides a video processing method, including: acquiring a video shot by a user, and in a situation that the video is a video with original sound shot based on an original audio, processing the video with original sound by a mark; and performing data separation on the video with original sound according to the mark, and extracting the original audio from the video with original sound; wherein the extracted original audio is used for video shooting by other users.

An embodiment of the disclosure provides a video processing device, configured in the terminal, including: a marker disposed to acquire a video shot by a user and process the video with original sound by a mark in a situation that the video is a video with original sound shot based on an original audio, and a separator disposed to perform data separation on the video with original sound according to the mark and extract the original audio from the video with original sound; the extracted original audio is used for video shooting by other users.

An embodiment of the disclosure provides a terminal, including: at least one processor; a memory, configured to store at least one program; when the at least one program is executed by the at least one processor, the at least one processor implementing the video processing method of any one of embodiment of the disclosure.

An embodiment of the disclosure provides a computer readable storage medium storing a computer program, the computer program being executed by a processor to implement the video processing method according to any one of embodiment of the disclosure.

The embodiment of the disclosure acquires a video shot by a user firstly, and in a situation that the video is a video with original sound shot based on an original audio, processes the video with original sound by a mark; and performs data separation on the video with original sound according to the mark, and extracts the original audio from the video with original sound; the extracted original audio is used for video shooting by other users, which solves the problem that the Internet enterprises lack sufficient management and utilization of the video taken by the user, and the user has limited selection of shooting elements, which not only achieve full management and utilization of the video shot by the user, but also the effect of extracting the original audio from the video with original sound shot by the user, at the same time achieve the effect of enriching the elements for video shooting.

DETAILED DESCRIPTION OF THE EMBODIMENTS

The disclosure will be illustrated with reference to embodiments and drawings therewith. The specific embodiments described herein are merely illustrative of the disclosure and are not intended to be limiting. In addition, for the convenience of description, only some but not all of the structures related to the disclosure are shown in the drawings.

Figure 1:
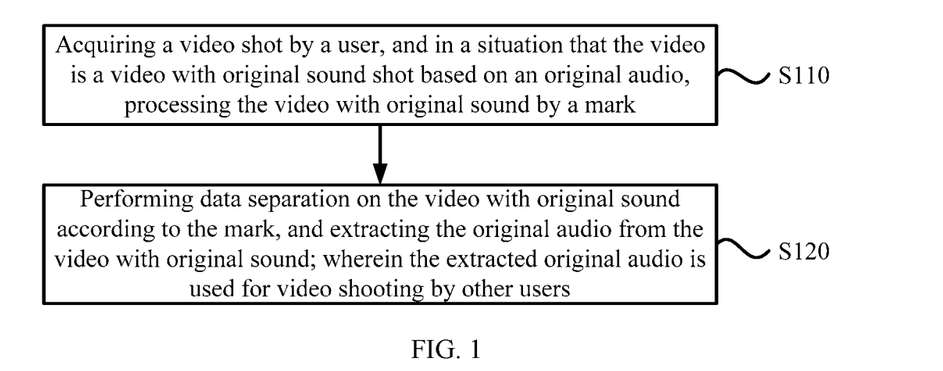
FIG. 1 is a schematic flowchart of a video processing method provided by an embodiment of the disclosure.

FIG. 1 is a schematic flowchart of a video processing method provided by an embodiment of the disclosure. This embodiment is applicable to a situation of processing a video shot by a user. The method can be performed by a corresponding video processing device. The device can perform the method by means of software and/or hardware and can be configured on any terminal with network communication function, such as smart phones, tablets, and so on.

As shown in FIG. 1, the video processing method provided by an embodiment of the disclosure can include the following steps.

S110: a video shot by a user is acquired, and in a situation that the video is a video with original sound shot based on an original audio, the video with original sound is processed by a mark.

The user can enable the client of the video interactive application in the terminal to perform video shooting. If the user selects non-original audio such as an existing song as the background music before shooting, a video without original sound will be obtained after shooting, and if the user doesn't select the background music, a video with original sound will be obtained after shooting. After the user completes the shooting, the terminal acquires the video shot by the user, and can determine whether the video shot currently by the user is the video with original sound by marking user operation of selecting the background music or identifying the background music selected by the user. For example, the terminal can call a marking program to first mark the user's operation of whether to select the background music or not. If the user doesn't select the background music, the obtained video with original sound is directly marked after the user completes the shooting; or after the user completes the shooting, the terminal calls an identification program to identify the background music in the video shot by the user to determine whether the video is a video with original sound or not, and if so, the video with original sound is marked for subsequent data separation of the marked video.

Considering that the video is stored in a certain area in a video format after video shooting. The video shot by the user can be divided into two categories by the mark: the video with original sound and the video without original sound, thereby facilitating the terminal to manage and operate different types of videos.

In an embodiment, the process of processing the video with original sound by a mark includes: marking the video with original sound by adding a preset field to a file of the video with original sound.

In an embodiment, the process of obtaining a video shot by a user and processing the video with original sound by a mark can be performed in the process of storing the data after the video shooting is completed, and a terminal adds a preset field to a file of the video with original sound; Or the terminal can separately add different preset fields to the original audio and the non-original audio files to distinguish them, which can likewise achieve the effect of marking the video with original sound. In an embodiment, the position adding the preset field may be a file header, and the form of the preset field may be preset in the setting window of the client, or may be preset by the developer in the background system of the client.

S120: the video with original sound is performed by data separation according to the mark, and the original audio is extracted from the video with original sound; the extracted original audio is used for video shooting by other users.

The terminal performs distinction between the video with original sound and the video without original sound according to the mark, and then performs data separation on the video with original sound, extracts the original audio from the video with original sound and stores the original audio in the audio format. The extracted original audio can be used as the background music of videos shot by other users in the form of data sharing, so that the selection of the background music during the video shooting is no longer limited to the audio of existing songs, which increases selectivity of the shooting elements for the user. At the same time, the Internet companies obtain the original audio by performing data separation on the video with original sound shot by the user, which not only can fully manage and utilize the videos shot by the user, but also can expand the existing audio database. In this embodiment, data separation and the extraction of original audio can be implemented by calling the audio extraction tool in the terminal over the client of video interaction application, or by using the audio extraction tool embedded in the client of the video interaction application. The implementation is not limited in this embodiment.

The technical solution of the embodiment of the disclosure acquires the video shot by the user, and in a situation that the video is a video with original sound shot based on an original audio, processes the video with original sound by a mark, and then performs data separation on the video with original sound according to the mark, and extracts the original audio from the video with original sound; the extracted original audio is used for video shooting by other users, which can solve the problem that the Internet enterprise lacks sufficient management and utilization of the videos shot by the user and the user has limited selection of shooting elements, which not only achieve full management and utilization of the videos shot by the user, but also realizing the effect of extracting the original audio from the video with original sound shot by the user, further increasing selectivity of the shooting elements for the user.

Figure 2:
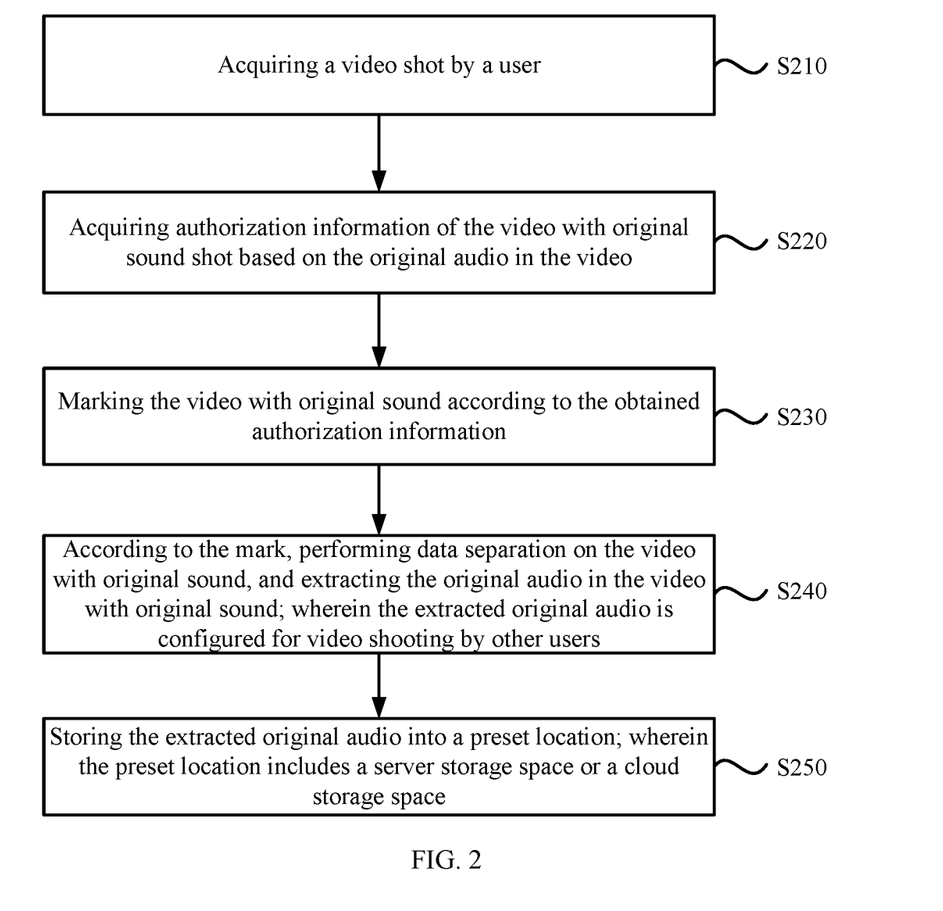
FIG. 2 is a schematic flowchart of another video processing method provided by an embodiment of the disclosure.

FIG. 2 is a schematic flowchart of another video processing method provided by an embodiment of the disclosure. This embodiment is described on the basis of the foregoing embodiment. As shown in FIG. 2, the method can include the following steps.

S210, a video shot by a user is acquired.

S220, authorization information of the video with original sound shot based on the original audio in the video is acquired.

In this embodiment, it is only necessary to perform data separation on the video with original sound shot by the user to extract the original audio in the video with original sound. Therefore, only the authorization information for the video with original sound is required after acquiring the video shot by the user.

Figure 3A:
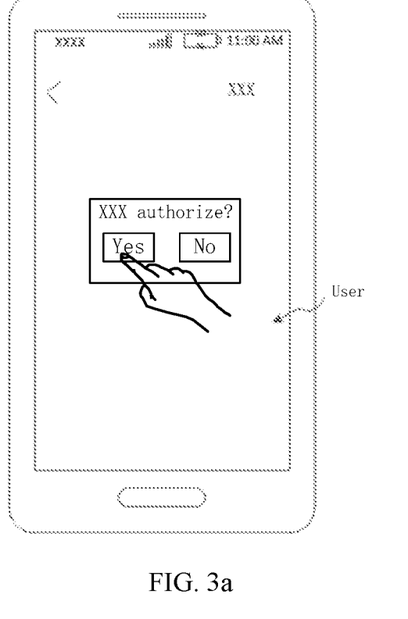
FIG. 3a is a schematic view of a video display interface showing a floating icon of whether to authorize or not provided by an embodiment of the disclosure.
Figure 3B:
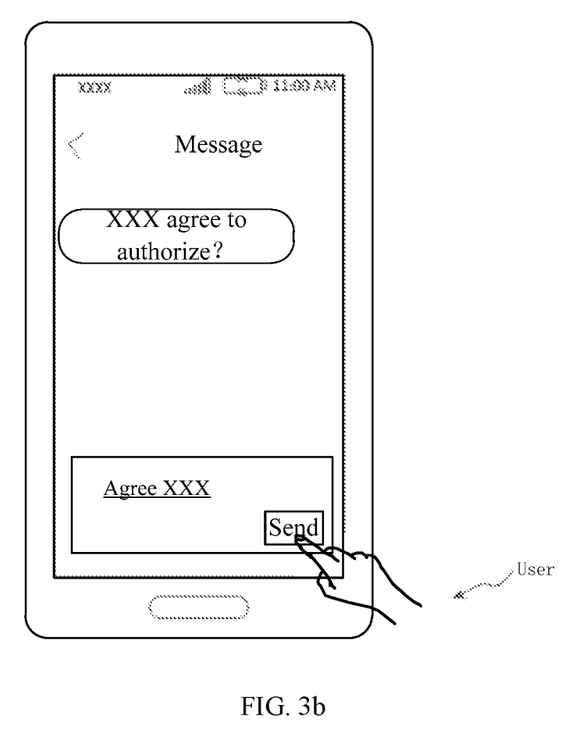
FIG. 3b is a schematic view of a user message interface on a client provided by an embodiment of the disclosure.

After the terminal obtains the video with original sound shot by the user, it needs to obtain the user's authorization for the video with original sound, that is, it is forbidden to mark the video with original sound and extract the original audio without the permission from the user. In an embodiment, the form of obtaining user authorization can be a prompt message shown to the user for requesting authorization on the display interface after video with original sound shooting is completed. Exemplarily, as shown in FIG. 3*a*, a prompt message selecting whether to authorize the video with original sound or not is displayed on the display interface of the video with original sound in the form of a floating icon. The user selects "Yes" to agree with the authorization, and selects "No" to disagree with the authorization. In another embodiment, it is also possible to send the user a message requesting whether to authorize or not on the user message interface of the client, and confirm whether the user agrees to the authorization by obtaining the reply message of the user. Exemplarily, as shown in FIG. 3*b*, a message of whether to authorize or not is displayed on the user message interface of the client, and the user can select to reply agreement or disagreement in the dialog input box.

The terminal confirms whether to mark the acquired video with original sound according to the feedback of the user.

S230, the video with original sound is marked according to the obtained authorization information.

After the terminal obtains the authorization information of the user, the video with original sound shot by the user can be marked.

S240, the video with original sound is performed by data separation according to the mark, and the original audio in the video with original sound is extract; the extracted original audio is used for video shooting by other users.

S250, the extracted original audio is stored into a preset location; the preset location includes a server storage space or a cloud storage space.

The terminal stores the extracted original audio in the server storage space or the cloud storage space. Different users log into the client, and as long as they communicate over the network, they can share the original audio, and shoot the same type of video based on the original audio.

The technical solution of the embodiment of the disclosure first acquires the video with original sound shot by the user and the authorization information of the video, and then marks the video with original sound according to the authorization information, and finally extracts the original audio from the video with original sound according to the mark, and stores the original audio into the preset position, which can solve the problem of lacking sufficient management and utilization of the videos shot by the users and limited selection of shooting elements for the users, and not only achieve full management and utilization of the video shot by the user, but also realize the effect of extracting the original audio from the video with original sound shot by the user and the effect of increasing the shooting elements for the user. The acquisition of the authorization information avoids the copyright dispute problem involved in the original audio in the video with original sound captured by the user. The storage of original audio increases the selectivity of background music when other users are shooting video and the convenience of using the original audio.

Figure 4:
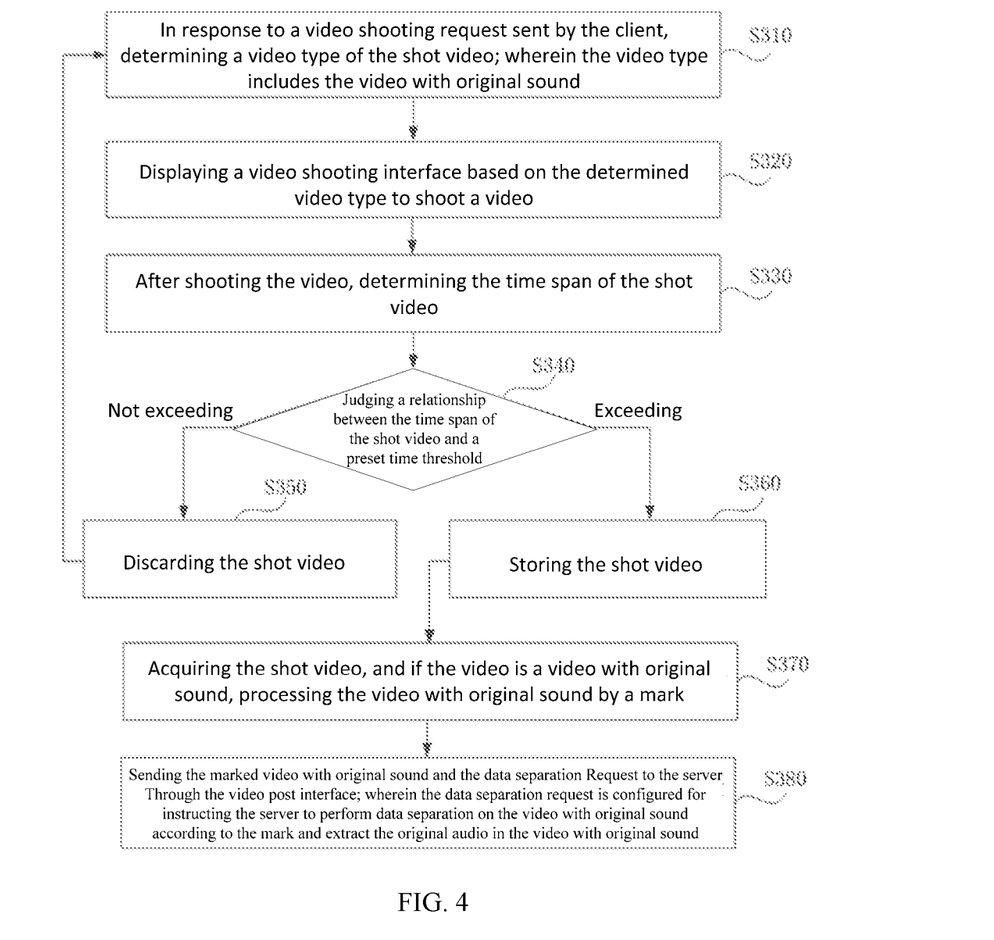
FIG. 4 is a schematic flowchart of another video processing method provided by an embodiment of the disclosure.

FIG. 4 is a schematic flowchart of another video processing method provided by an embodiment of the disclosure. This embodiment is performed on the basis of the foregoing embodiment. As shown in FIG. 4, the method can include the following steps.

S310, a video type of the shot video is determined in response to a video shooting request sent by the client; the video type includes the video with original sound.

The user enables the client of a video interactive application in the terminal, and sends the video shooting request by triggering the shooting identifier on the client interface. In an embodiment, the triggering operation includes a clicking operation or a sliding operation. The terminal determines the type of video to be shot by determining whether the user performs background music selection in response to the user's video shooting request. When it is determined that the user doesn't select the background music, it is determined that the video type of the video to be shot is the video with original sound.

S320, a video shooting interface is displayed based on the determined video type to shoot a video.

After determining the user is going to take the video with original sound, the current interface of the client is switched to the video shooting interface, and the user can shoot the video with original sound.

S330. After shooting the video, the time span of the shot video is determined.

In this embodiment, the time span of the video shot by the user needs to reach a certain length of time for the shooting operation to be effected. Therefore, after the user completes the shooting, the terminal needs to call the time detecting program to determine the time span of the video shot by the user.

S340, a relationship between the time span of the shot video and a preset time threshold is judged.

If the time span of the video is no longer than the preset time threshold, the step S350 is performed to discard the shot video; if the time span of the video exceeds the preset time threshold, the step S360 is performed to store the shot video.

S350, the shot video is discarded.

The preset time threshold can be determined according to different clients or shooting scenes, such as 3 seconds. If the time span of the shot video is too short, the shooting will be invalid. The terminal will not perform the subsequent data separation operation. At this time, it can return to step S310 again to perform a corresponding process when the user issues a video shooting request again.

S360, the shot video is stored.

If the time span of the shot video exceeds the preset time threshold; in other words, the video shooting requirement is met, the terminal can store the shot video for subsequent data separation operations.

S370, the shot video is acquired, and in a situation that the video is a video with original sound shot based on an original audio, the video with original sound is processed by a mark.

In this embodiment, before marking the video with original sound, the authorization information is required to avoid the copyright dispute problem involved when the original audio in the video shot by the user is used by other users.

S380, the marked video with original sound and the data separation request are sent to the server through the video post interface; the data separation request is used to instruct the server to perform data separation on the video with original sound according to the mark and extract the original audio in the video with original sound.

Switching from the video shooting interface to the video post interface can be implemented by triggering the switch identifier of the video shooting interface. For example, the switching identifier may be a "next" display icon set at the lower right of the video shooting interface for prompting the user to perform the next operation, or a display icon with the word "submit" directly displayed at the lower right of the video shooting interface.

Figure 5:
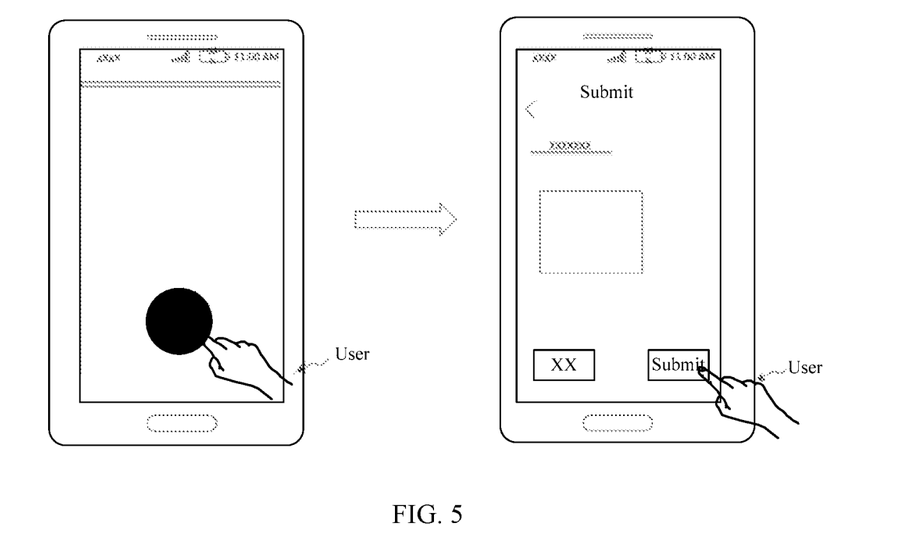
FIG. 5 is a schematic view of switching from a video shooting interface to a video post interface provided by an embodiment of the disclosure.

Exemplarily, as shown in FIG. 5, the user performs video shooing by triggering the shooting identifier on the video shooting interface. After the video shooting is completed, the video capture interface is switched to the video post interface by triggering the switching identifier. On the video post interface, the user can select to input related texts. By triggering the submit identifier located at the lower part of the video post interface, the operation of sending the video to the server is completed, and the data separation request is also sent to the server at the same time.

After receiving the marked video with original sound and the data separation request sent by the terminal, the server confirms the video with original sound according to the mark, and then can call the audio extraction tool, for example, the audio extraction function in the FFmpeg (Fast Forward Fast Forward Moving Picture Experts Group), to extract the original audio in the video with original sound and store the original audio in the original audio database in audio format for subsequent usage by different clients.

Figure 6:
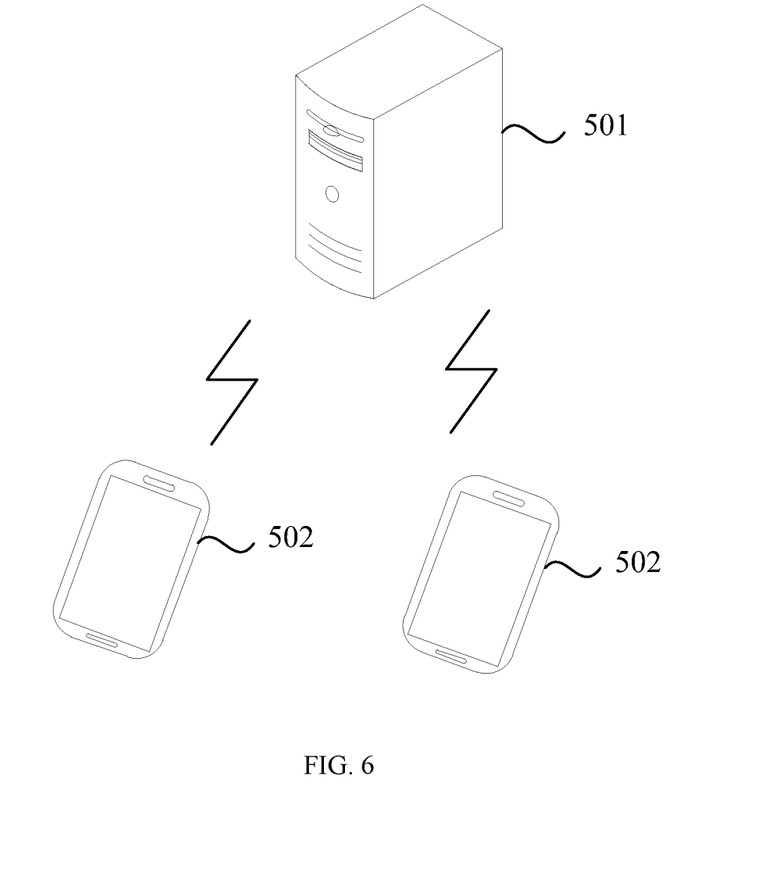
FIG. 6 is an interaction schematic view between terminals and a server during extracting an original audio provided by an embodiment of the disclosure.

As shown in FIG. 6, the server 501 can maintain communication with a plurality of terminals 502 at the same time to acquire the video with original sound with the mark sent by the plurality of terminals 502, and extract the original audio in the video with original sound by data separation, and then, sent the original audio to different terminals 520 according to the use request of the extracted original audio by the clients in different terminals 520.

The technical solution of the embodiment of the disclosure first determines the video type of the video to be shot in response to the video shooting request, and then enters the video shooting interface, after the shooting is completed, judges whether to perform the subsequent video mark and the original audio separation operations or not by determining the time span of the shot video, marks the video after confirming that the time span of the shot video exceeds the preset time threshold, and finally sends the marked video to the server for original audio separation, which solve the problem that the Internet enterprise lacks sufficient management and utilization of the video shot by the user and the user has limited selection of shooting elements to achieve full management and utilization of the video shot by the user and the effect of extracting the original audio from the video with original sound shot by the user, as well as the effect of enriching the elements for video shooting.

Figure 7:
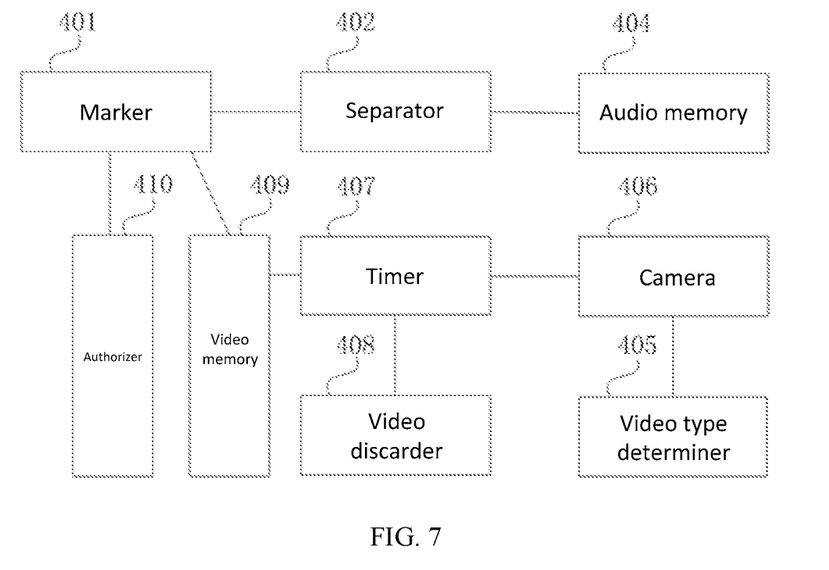
FIG. 7 is a schematic structural view of a video processing device provided by an embodiment of the disclosure.
Figure 8:
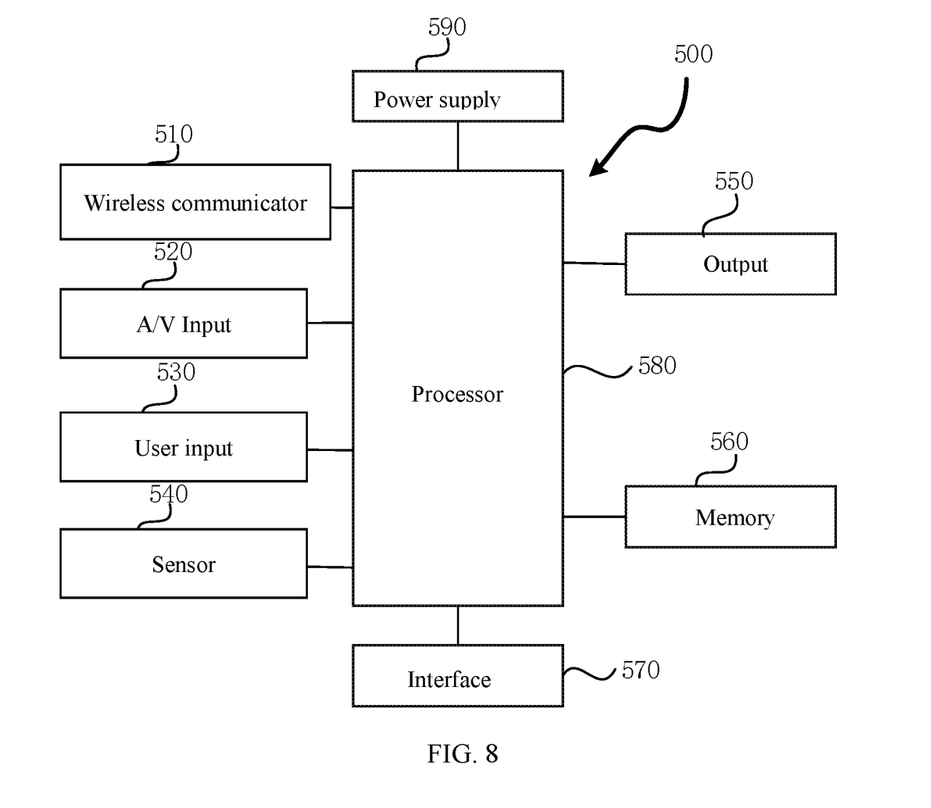
FIG. 8 is a hardware structural schematic view of a terminal provided by an embodiment of the disclosure.

FIG. 7 is a schematic structural view of a video processing device provided by an embodiment of the disclosure. This embodiment is applicable to process a video shot by a user. The video processing device can perform by means of software and/or hardware and can be configured in any terminal with a network communication function.

As shown in FIG. 7, the video processing device provided in the embodiment of the disclosure can include a marker 401 and a separator 402. In this embodiment, the marker 401 is disposed to acquire a video shot by the user and process the video with original sound by a mark in a situation that the video is a video with original sound shot based on an original audio; the separator 402 is disposed to perform data separation on the video with original sound according to the mark, and extract the original audio from the video with original sound; wherein the extracted original audio is used for video shooting by other users.

What is claimed is:

1. A video processing method, comprising:
    acquiring a video shot by a user, and in a situation that the video is a video with original sound shot based on an original audio, processing the video with original sound by a mark;
    performing data separation on the video with original sound according to the mark, and extracting the original audio from the video with original sound; wherein the extracted original audio is used for video shooting by other users; and
    wherein the processing the video with original sound by a mark further comprises marking the video with original sound by adding a preset field to a file of the video with original sound.

2. The video processing method according to claim 1, wherein the performing data separation on the video with original sound according to the mark, and extracting the original audio from the video with original sound comprises:
    transmitting the video with original sound processed by the mark and a data separation request to a server through a video post interface; wherein the data separation request is used to instruct the server to perform the data separation on the video with original sound according to the mark and extract the original audio from the video with original sound.

3. The video processing method according to claim 1, wherein after performing data separation on the video with original sound according to the mark, and extracting the original audio from the video with original sound, the video processing method further comprises:
    storing the extracted original audio in a preset location, wherein the preset location comprises a server storage space or a cloud storage space.

4. The video processing method according to claim 1, wherein before acquiring a video shot by a user, the video processing method further comprises:
    determining a video type of the shot video in response to a video shooting request sent by a client, wherein the video type comprises the video with original sound; and
    displaying a video shooting interface based on the video type to shoot the video.

5. The video processing method of claim 4, wherein the video processing method further comprises:
    after shooting the video, determining a time span of the shot video;
    if the time span is no longer than a preset time threshold, discarding the shot video;
    if the time span exceeds the preset time threshold, storing the shot video.

6. The video processing method according to claim 1, wherein before processing the video with original sound by a mark, the video processing method further comprises:
    acquiring authorization information of the video with original sound to mark the video with original sound according to the authorization information.

7. A terminal, comprising:
    at least one processor;
    a memory storing at least one program that upon execution by the at least one processor causes the terminal to:
    acquire a video shot by a user, and in a situation that the video is a video with original sound shot based on an original audio, process the video with original sound by a mark;
    perform data separation on the video with original sound according to the mark, and extract the original audio from the video with original sound; wherein the extracted original audio is used for video shooting by other users; and
    wherein the memory further stores program that upon execution by the at least one processor causes the terminal to mark the video with original sound by adding a preset field to a file of the video with original sound.

8. A non-transitory computer readable storage medium, storing a computer program to perform operations when the computer program is executed by a processor, the operations comprising:
    acquiring a video shot by a user, and in a situation that the video is a video with original sound shot based on an original audio, processing the video with original sound by a mark;
    performing data separation on the video with original sound according to the mark, and extracting the original audio from the video with original sound; wherein the extracted original audio is used for video shooting by other users; and
    wherein the processing the video with original sound by a mark further comprises marking the video with original sound by adding a preset field to a file of the video with original sound.

9. The video processing method according to claim 1, wherein the performing data separation on the video with original sound according to the mark, and extracting the original audio from the video with original sound comprises:
  transmitting the video with original sound processed by the mark and a data separation request to a server through a video post interface; wherein the data separation request is used to instruct the server to perform the data separation on the video with original sound according to the mark and extract the original audio from the video with original sound.

10. The video processing method according to claim 1, wherein after performing data separation on the video with original sound according to the mark, and extracting the original audio from the video with original sound, the video processing method further comprises:
  storing the extracted original audio in a preset location, wherein the preset location comprises a server storage space or a cloud storage space.

11. The terminal according to claim 7, the memory further stores program that upon execution by the at least one processor causes the terminal to:
  transmit the video with original sound processed by the mark and a data separation request to a server through a video post interface; wherein the data separation request is used to instruct the server to perform the data separation on the video with original sound according to the mark and extract the original audio from the video with original sound.

12. The terminal according to claim 7, the memory further stores program that upon execution by the at least one processor causes the terminal to:
  transmit the video with original sound processed by the mark and a data separation request to a server through a video post interface; wherein the data separation request is used to instruct the server to perform the data separation on the video with original sound according to the mark and extract the original audio from the video with original sound.

13. The terminal according to claim 7, the memory further stores program that upon execution by the at least one processor causes the terminal to:
  store the extracted original audio in a preset location, wherein the preset location comprises a server storage space or a cloud storage space.

14. The terminal according to claim 7, the memory further stores program that upon execution by the at least one processor causes the terminal to:
  store the extracted original audio in a preset location, wherein the preset location comprises a server storage space or a cloud storage space.

15. The terminal according to claim 7, the memory further stores program that upon execution by the at least one processor causes the terminal to:
  determine a video type of the shot video in response to a video shooting request sent by a client, wherein the video type comprises the video with original sound; and
  display a video shooting interface based on the video type to shoot the video.

16. The terminal according to claim 15, the memory further stores program that upon execution by the at least one processor causes the terminal to:
  after shoot the video, determine a time span of the shot video;
  if the time span is no longer than a preset time threshold, discard the shot video;
  if the time span exceeds the preset time threshold, store the shot video.

17. The terminal according to claim 7, the memory further stores program that upon execution by the at least one processor causes the terminal to:
  acquire authorization information of the video with original sound to mark the video with original sound according to the authorization information.

* * * * *